US008177185B2

(12) United States Patent
Priegel

(10) Patent No.: US 8,177,185 B2
(45) Date of Patent: May 15, 2012

(54) FLAG POLE ASSEMBLY

(75) Inventor: Jack C. Priegel, El Paso, TX (US)

(73) Assignee: Wind Gear Direct, LLC, El Paso, TX (US)

( * ) Notice: Subject to any disclaimer, the term of this patent is extended or adjusted under 35 U.S.C. 154(b) by 33 days.

(21) Appl. No.: 12/699,148

(22) Filed: Feb. 3, 2010

(65) Prior Publication Data

US 2011/0185960 A1 Aug. 4, 2011

(51) Int. Cl.
*A01K 97/10* (2006.01)
*A45B 25/28* (2006.01)
*A47G 25/12* (2006.01)
*A47G 33/12* (2006.01)
*H01Q 1/12* (2006.01)

(52) U.S. Cl. ... 248/539; 248/530; 248/156; 248/346.03; 248/346.5; 248/523; 248/346.04; 248/508; 248/507; 135/16

(58) Field of Classification Search .................. 248/530, 248/156, 346.01, 346.03, 346.5, 539, 357, 248/514, 536, 314, 519, 523, 524, 346.04, 248/346.06, 507, 508; 135/16, 84, 115, 118; 108/50.12; 116/173; 52/155, 159, 165
See application file for complete search history.

(56) References Cited

U.S. PATENT DOCUMENTS 3,067,717 A 12/1962 Imparato
3,445,809 A * 5/1969 McLoad ........................ 367/188
3,664,617 A * 5/1972 Fenwick ........................ 248/539
3,767,355 A * 10/1973 Anderson, Jr. ................ 431/295
3,967,575 A * 7/1976 Coutts ......................... 116/35 A
4,161,723 A 7/1979 De Vittori
4,565,466 A * 1/1986 Daggs et al. .................... 404/10
4,862,823 A 9/1989 Hughes
4,940,203 A * 7/1990 Hayakawa ................. 248/188.9
5,186,119 A 2/1993 Hlavin
5,301,462 A * 4/1994 Hronyetz ........................ 47/40.5
5,398,444 A * 3/1995 Murray ........................... 47/40.5
5,451,045 A * 9/1995 Garske .......................... 473/176
5,634,733 A * 6/1997 Sperduti ........................... 403/2
5,755,528 A 5/1998 Kulp et al.
5,845,890 A * 12/1998 Earsley et al. ................ 248/516
5,865,413 A * 2/1999 Niemann et al. .............. 248/314
5,881,495 A * 3/1999 Clark ............................. 47/48.5
6,345,722 B1 * 2/2002 Wingate ....................... 211/70.2
6,402,117 B1 * 6/2002 Tsai ............................... 248/530
6,978,567 B1 * 12/2005 Pearsall ........................... 40/666
7,090,183 B2 * 8/2006 Heybl et al. ................... 248/314
7,147,399 B2 * 12/2006 Viscount et al. .............. 403/349
7,246,781 B2 * 7/2007 Nam ............................. 248/516
7,396,268 B2 * 7/2008 Hyjek ............................. 441/11
7,455,594 B1 * 11/2008 Priegel .......................... 473/176
7,500,919 B2 * 3/2009 Priegel .......................... 473/176
7,594,859 B2 * 9/2009 Mullen .......................... 473/176
2004/0169121 A1 * 9/2004 Winn ............................ 248/530

FOREIGN PATENT DOCUMENTS

JP 2004-215790 A 8/2004

* cited by examiner

*Primary Examiner* — Terrell McKinnon
*Assistant Examiner* — Michael McDuffie
(74) *Attorney, Agent, or Firm* — Fitch, Even, Tabin & Flannery, LLP

(57) ABSTRACT

A knock down flag pole assembly is provided including a base, a ferrule, and an elongate post. The base may include a coupling with a pocket having a coupling member or portion configured to removably couple to the ferrule. The coupling secures the ferrule to the base, but also permits the flag pole to be knocked out from the base.

15 Claims, 8 Drawing Sheets

FLAG POLE ASSEMBLY

FIELD

The present disclosure relates to marking structures and, more particularly, to a flag pole and base assembly.

BACKGROUND

Marking structures are often used for identifying various boundaries, geographic locations, and for many other uses. Common types of marking structures include flag poles, pylons, goal posts, etc. One example is a flag pole to identify a boundary line or other locale on an athletic field. In such use, it may be desired that the flag pole be able to withstand deformation due to wind or contact with other objects.

A common solution for prior flag poles is the use of a spring coupling near the base of the flag pole that allows the flag pole to give way when contacted by the athletes or other objects. However, with such prior spring based poles, as the spring gives way, it also builds up elastic potential energy. This built-up energy of the spring typically causes it to return or snap back to its previous position, which causes the pole to quickly swing back to the upright position or even oscillate back and forth. The swinging of prior flag poles resulting from its spring connection between the flag pole and the base may strike objects or people in the vicinity of the pole by the rapid movement of the pole. Additionally, when the prior spring deforms to allow the pole to move, spring coils forming the spring coupling may also separate and form a gap through which unintended objects can be pinched when the spring returns to its original state. These same shortcomings may also be present in flag poles that are generally flexible. While they may not have a spring installed at the base, the pole itself acts a spring.

Both styles of flexing poles are also subject to inconsistent identification of location due to wind, rain, and other outside forces. The flexible nature of the poles makes them easily susceptible to undesired movement from wind gusts and the like, which is especially troublesome for athletic events requiring the relatively accurate location of markers. A marker that is leaned over because of wind does not necessarily identify an accurate boundary or other locale. These markers may also be subject to permanent deformation over time due to the repeated flexing because the spring or other biasing member deforms, fails, or stretches out.

Some poles use a combination of a base and pole wherein the pole is inserted into a stationary base. The base can be installed prior to installing the pole. These poles include a connector installed at one end of the base. These types of connectors commonly use a bayonet-type connection that requires specific alignment of the base and flag pole connector. In order to properly install the pole into the base, the user must orient the pole in a specific manner relative to the base permitting insertion of the flag pole connector into the bayonet connection of the base, and subsequently adjust the connector to ensure that the pole locks to the base and does not become disengaged from the base. In order to remove the pole from the base, the user must again manipulate the pole in a specific manner relative to the base to unlock and disengage the pole from the base, and then remove the pole in the same direction in which it was initially inserted.

DETAILED DESCRIPTION OF THE PREFERRED EMBODIMENTS

Figure 1:
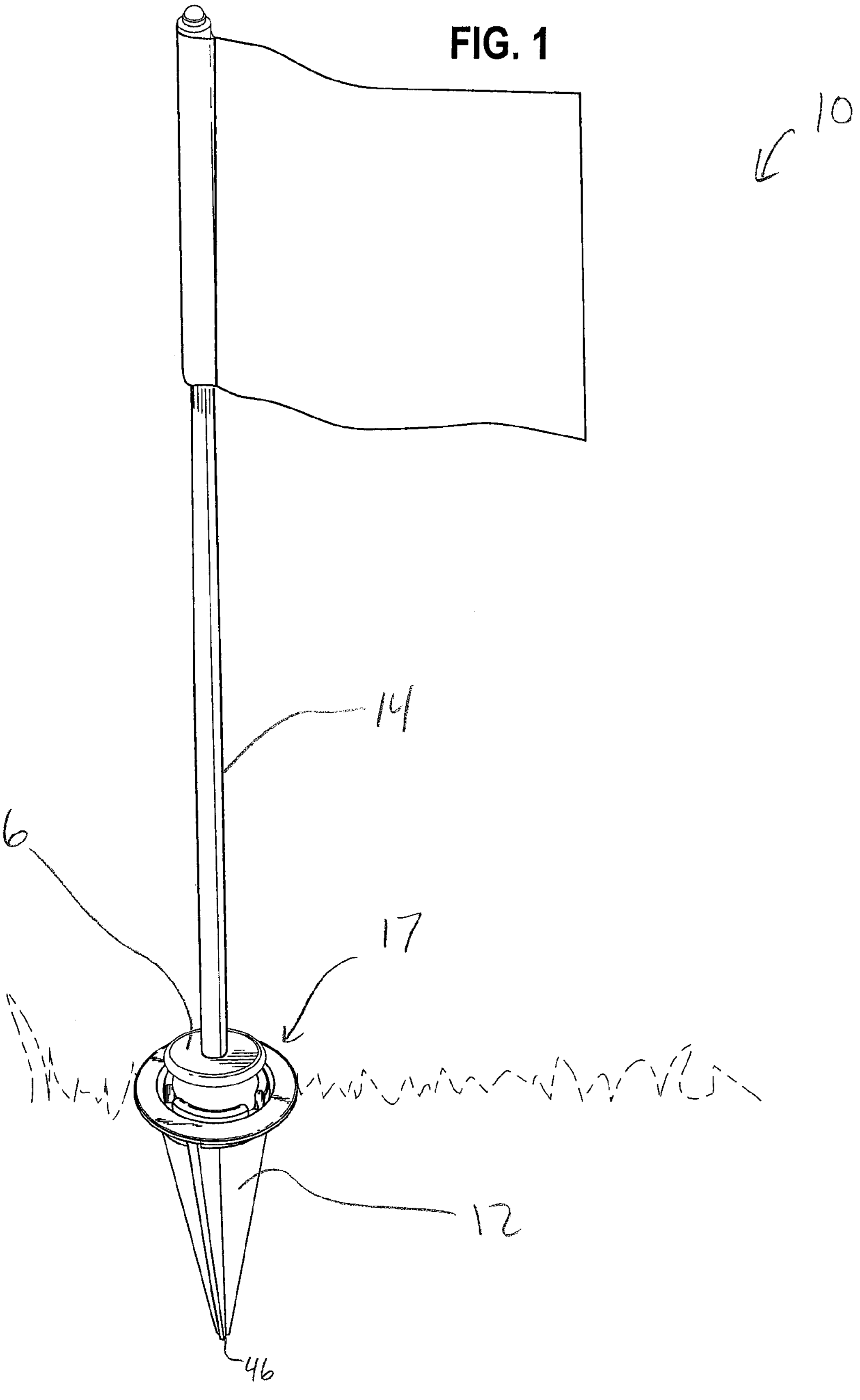
FIG. 1 is a perspective view showing an embodiment of a flag pole and base assembly installed in the ground.

With reference to FIGS. 1-12, a flag pole and base assembly 10 is provided for marking particular locations and/or boundaries, such as athletic field boundaries, goal lines, targets, and the like. It will be appreciated, however, that such uses are only exemplary, as the assembly 10 may be used in other circumstances in which flag poles are commonly employed. As shown in FIG. 1, the flag pole and base assembly 10 generally includes a base 12 and a separate elongate post or pole 14 having a ferrule 16 at one end thereof where the ferrule 16 is configured to be removably received in the base 12. The other end of the post 14 may include a flag, marker, beacon, and the like, as shown in FIG. 1.

In one aspect, the assembly 10 includes a coupling or coupling interface 17 between the base 12 and the ferrule 16, which are separate from each other, that permits the ferrule 16 to snap into and out of the base 12 such that the post 14 can be knocked out of the base 12 upon a force applied to the post 14. In this manner, the assembly 10 has a base that is arranged to securely receive the post 14, but at the same time, safely allow the post 14 to snap out of and separate from the base 12 without the problems of prior flag pole assemblies where a spring biased flag pole could snap backward when the force is removed. With the post and base assemblies 10 herein, once the post 14 is subjected to sufficient force, such as being contacted by a player or object during a sporting event, the post 14 will simply snap out of the base 12 and fall to the ground.

In another aspect, the coupling 17 is preferably arranged so that the ferrule 16 and base 12 can be coupled in any circumferential or angular direction to permit ease of mating the two components. By one approach, the ferrule 16 and base 12 have corresponding mating portions where curvatures between the post ferrule 16 and base 12 are arranged so that the ferrule 16 can be mounted to the base 12 independent of a circumferential orientation of the ferrule 16 about the base 12, even with an angle of insertion of the post 14 tilted off perpendicular or inclined relative to the base 12. This configuration avoids the problem of prior bayonet-type type assemblies requiring specific circumferential orientations of the shaft and a perpendicular alignment relative to the base in order to couple the bayonet-type joint together. In the assemblies 10 herein, on the other hand, the post 14 can simply be inserted into the base 12 in any orientation and at any inclination relative to the base 12 providing a more robust assembly for ease of joining and disassembly. By another approach, the coupling 17 may be a form of a ball and socket-type joint defined by a convex outer surface of the ferrule 16 and an inner portion of the base 12 having a concave inner surface. Preferably, the concave surface or surfaces of the base 12 may be formed from resilient materials so that a small amount of resilient flexing of the base 12 may help aid in the insertion and/or removal of the post 14 from the base 12 as well as aid in securing the ferrule to the base.

With reference to FIGS. 2-5, one exemplary base 12 is shown in more detail. By one approach, the base 12 includes an upper mating portion 18 and a lower mounting member 40. The upper mating portion 18 is for coupling or mating to the ferrule 16 and lower mounting member 40 is for mounting the base 12 to a surface. As shown, the member 40 is in the form of a spike for insertion in the ground, but other types of mounting members 40 for securing or mounting to other surfaces may also be employed.

The base 12 is preferably made from a generally rigid plastic material but capable of resilient flexing such as nylon, Delron, ABS, and the like. As shown, the base 12 is preferably formed as a single or unitary construction; however, other configurations are also possible. The base 12 also has a longitudinal base axis B that passes through the center of the base.

In order to couple the ferrule 16, the base 12 includes the upper mating portion 18 arranged and configured to receive or couple to the ferrule 16. In one aspect, the mating portion 18 is defined in part by a recessed or first mating surface 20 that is oriented substantially transverse to the longitudinal base axis B and an upstanding peripheral wall 22 surrounding the surface 20 and, in one form, has a generally annular or cylindrical shape. The peripheral wall 22 terminates at an upper edge 24 which is preferably annular and circumscribes the surface 20. The upper edge 24 includes a radially outward projecting annular flange 26 that also preferably extends transverse to the longitudinal axis B. By such approach, the upper flange 26 is preferably substantially parallel to the recessed surface 20. As further described below, the base 12 is configured to be inserted into the ground, and the flange 26 allows a user to easily insert the base lower mounting member 40 into the ground by stepping on the flange 26 and may also be generally flush with the ground surface when the base is fully inserted.

Figure 2:
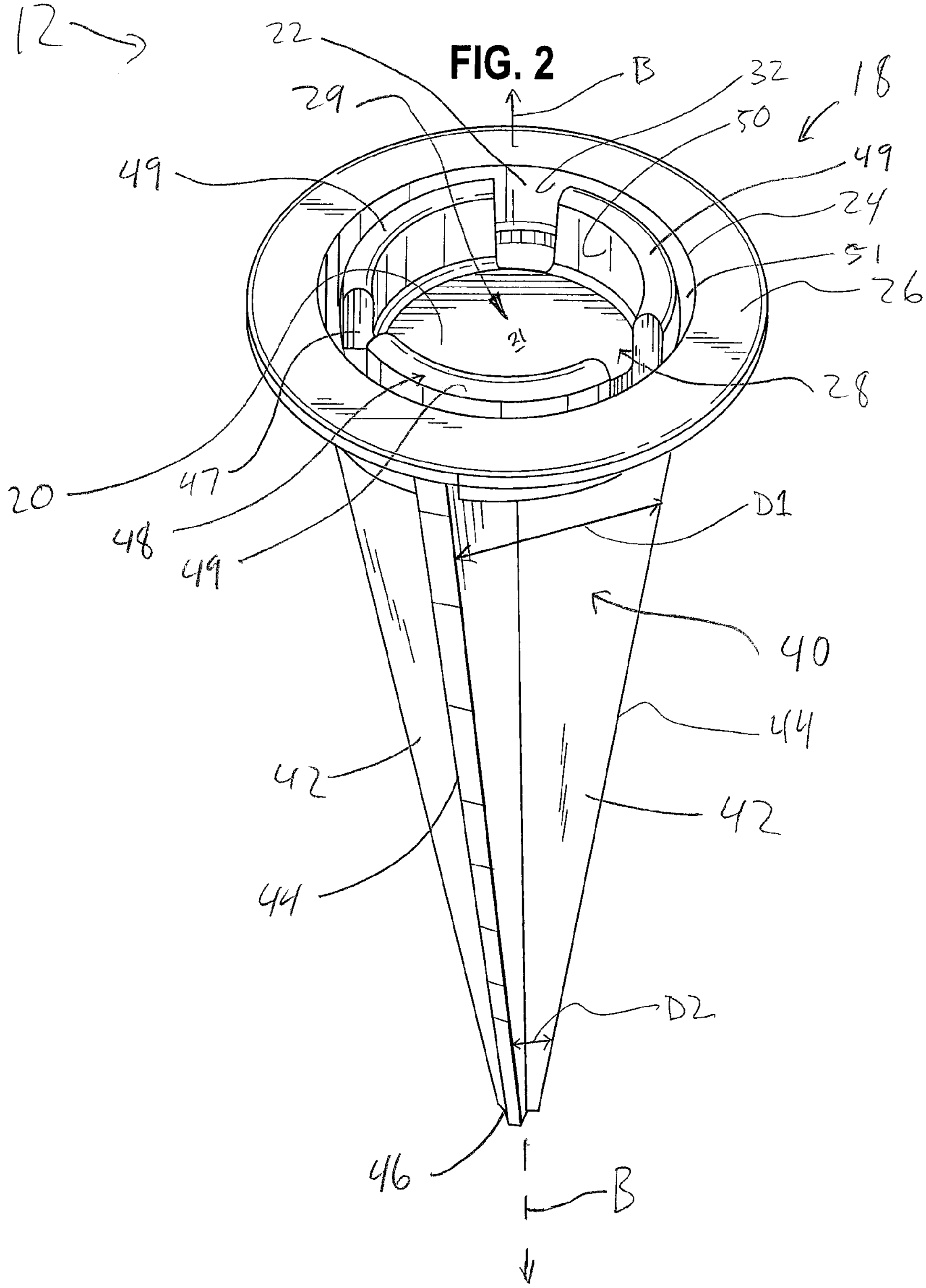
FIG. 2 is a perspective view showing the base of the assembly of FIG. 1.
Figure 3:
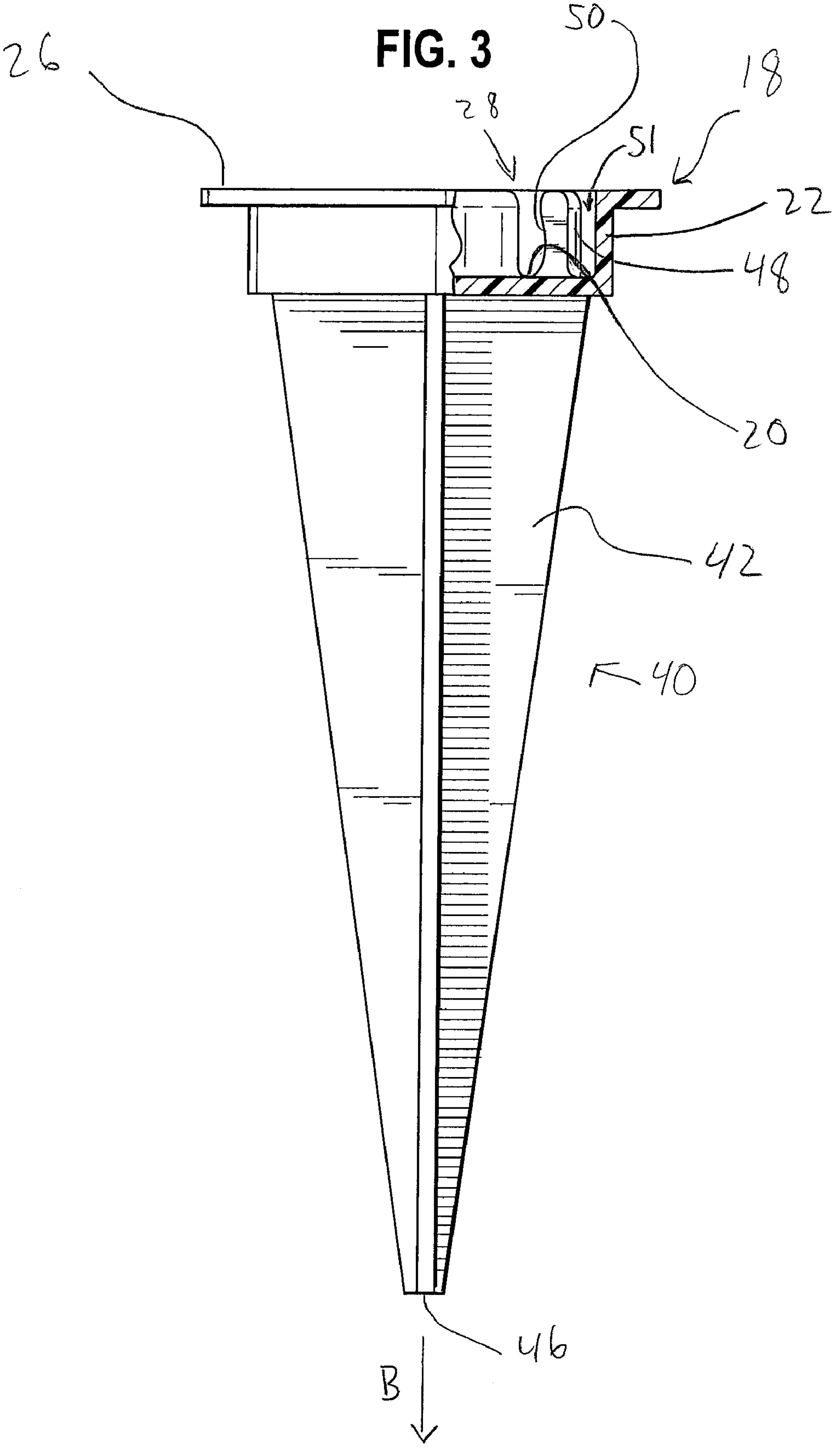
FIG. 3 is a side view of the base of FIG. 2 including a partial cutout.
Figure 4:
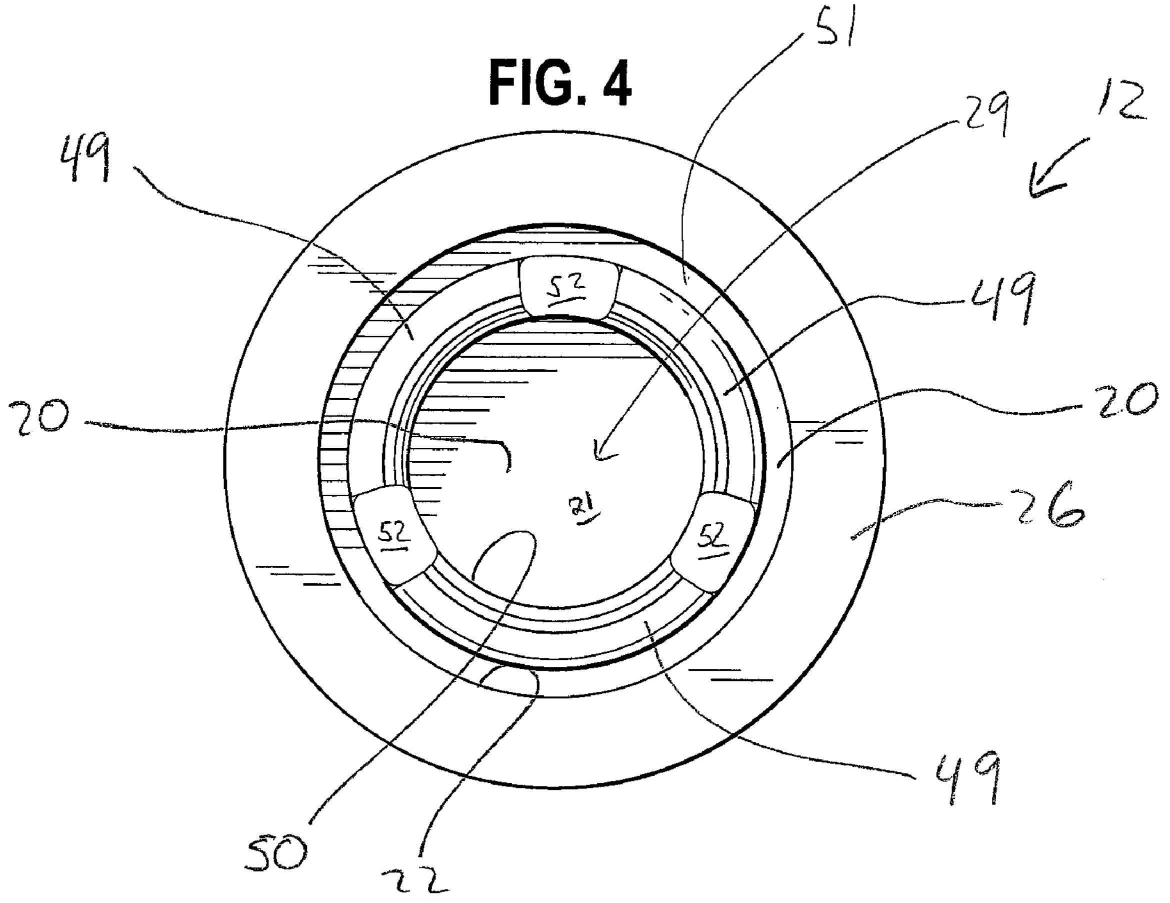
FIG. 4 is a top view of the base of FIG. 2.

As shown in FIGS. 2-5, the lower mating member 40 is preferably in the form of a ground insertion spike with a plurality of fins 42. By one approach, the lower mating member 40 is integral or formed in a unitary construction with the base mating portion 18, but other configurations, such as multiple component configurations, are also possible. The fins 42 may extend radially outward from the central longitudinal base axis B. The fins 42 may also be generally spaced in a circumferential direction equally about the longitudinal base axis B. So that the fins 42 may form a spike, they have an external edge 44 that tapers inwardly toward each other from adjacent the upper mating portion 18 to the opposite lower end 46 of the member 40. For example, the fins 42 are oriented such that a distance D1 between adjacent external edges 44 is greater near the upper mating portion 18 than a distance D2 at the lower end 46, as shown in FIG. 2. This taper of the fins 42 results in the external edges 44 forming a spike member where the fins 42 and edges 44 thereof generally form a point (preferably blunt) at the end 46 of the base 12 opposite the flange 26. In one embodiment, the base 12 includes three fins 42; however, other quantities can also be used.

As illustrated in FIG. 1, the base 12 is generally inserted into the ground or other relatively easily penetrated surface by inserting the point 46 of the base 12 into the ground (for purposes of description, the ground shall mean any of the surfaces in which the base 12 can be inserted). Depending on the conditions of the ground, such as hardness, soil type, temperature, presence of rocks or other impenetrable objects, etc., one's foot or a hammer or other tool can be used, if needed, for insertion. However, in most instances, the base 12 can be easily inserted by simply using the hands or feet of the user to push on the flange 26. In a preferred embodiment, the base 12 is inserted at a generally perpendicular angle to the ground surface; however, other angles of insertion relative to the ground are also possible.

By inserting the base 12 into the ground at a generally perpendicular angle, the flange 26 of the base 12 is preferably level with the ground surface. This ensures that the base 12 does not protrude too much from the ground, and the base 12 integrates with the ground in a relatively seamless manner.

The upper mating portion 18 also defines a cavity 28 therein formed by the recessed surface 20 and an inner surface 32 of the preferably annular wall 22. The cavity 28 also preferably includes a pocket 29 sized and configured to removably receive the ferrule 16 in a generally tight manner to secure the post 14 to the base 12. As shown in FIGS. 2-4, and 9-12, the inner boundaries of the pocket 29 are generally formed by a coupling member 48 in the cavity 28 and a central portion 21 of the lower recessed surface 20. For instance, extending upwardly along the axis B from the recessed surface 20 is the coupling member 48 forming sidewalls of the pocket 29 and arranged to couple the ferrule 16 and secure it within the pocket 29. By one approach, the coupling member 48 is a plurality of resilient ribs 49 circumferentially spaced about the axis B forming annular side walls of the pocket 29. As shown, the ribs 49 are disposed approximately equally about the longitudinal axis B, and have a generally arcuate shape with respect to the longitudinal axis B so that, in one form, an upper edge thereof forms an annular opening 70 to the pocket.

Figure 9:
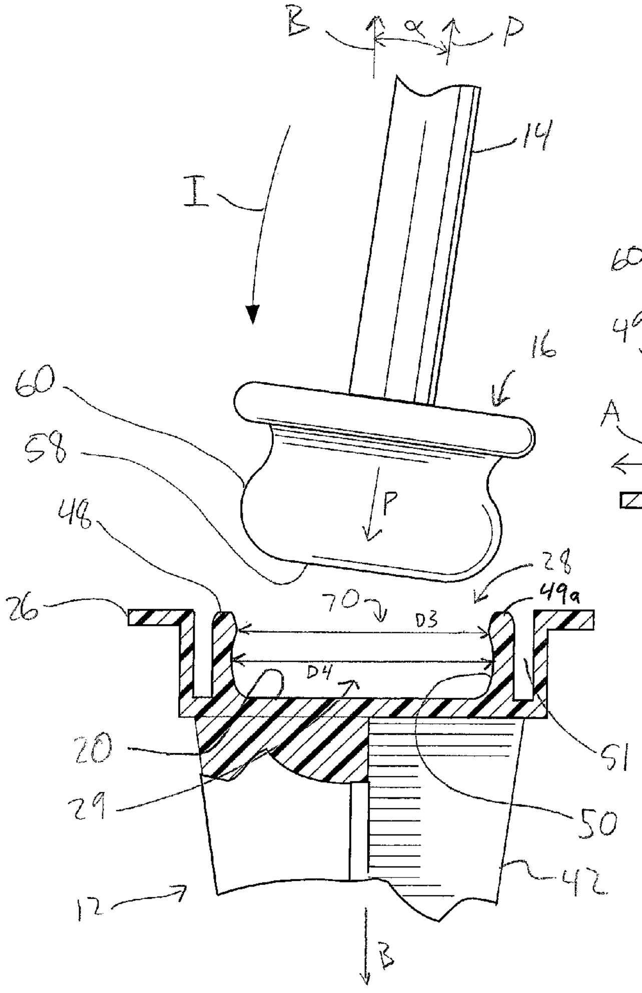
FIG. 9 is a cross-section of the base of FIG. 2 and a partial side view of the flag pole of FIG. 3 showing an installation of the assembly.

As discussed in more detail below, each rib 49 has an internal surface 50 extending along the longitudinal axis B. Preferably, the internal surface 50 is a curved surface having a generally concave curvature both along the axis B and transverse to the axis B. Preferably, between each rib 49 is an axial slot 47. As best shown in FIG. 9, the surface 50 has a radius of curvature measured along the longitudinal axis so that a diameter D3 between an upper edge 49*a* thereof is less than a diameter D4 intermediate the surface 50. The coupling member 48 extends from the recessed surface 20 but preferably does not extend past the flange 26. In one embodiment, three ribs 49 are used; however, other quantities would also suffice. The coupling member 48, like the other portions of the base 12, is made of a plastic material. In one form, the coupling member 48 is preferably formed of a resilient plastic material (nylon, Delron, ABS, and the like) capable of resilient flexing transverse to the axis B for allowing insertion and removal of the ferrule 16 in the pocket 29.

In order to accommodate the resilient flexing of the coupling member 48, the cavity 28 also includes an annular recess or channel 51 disposed between the coupling member 48 and the peripheral wall 22. The channel 51 provides a clearance or space between the coupling member 48 and wall 22 so that the ribs 49 (and in particular the upper edge 49*a* thereof) is free to resiliently shift or flex into the channel 51 when the ferrule 16 is inserted into the pocket 29 as discussed in more detail below.

Figure 5:
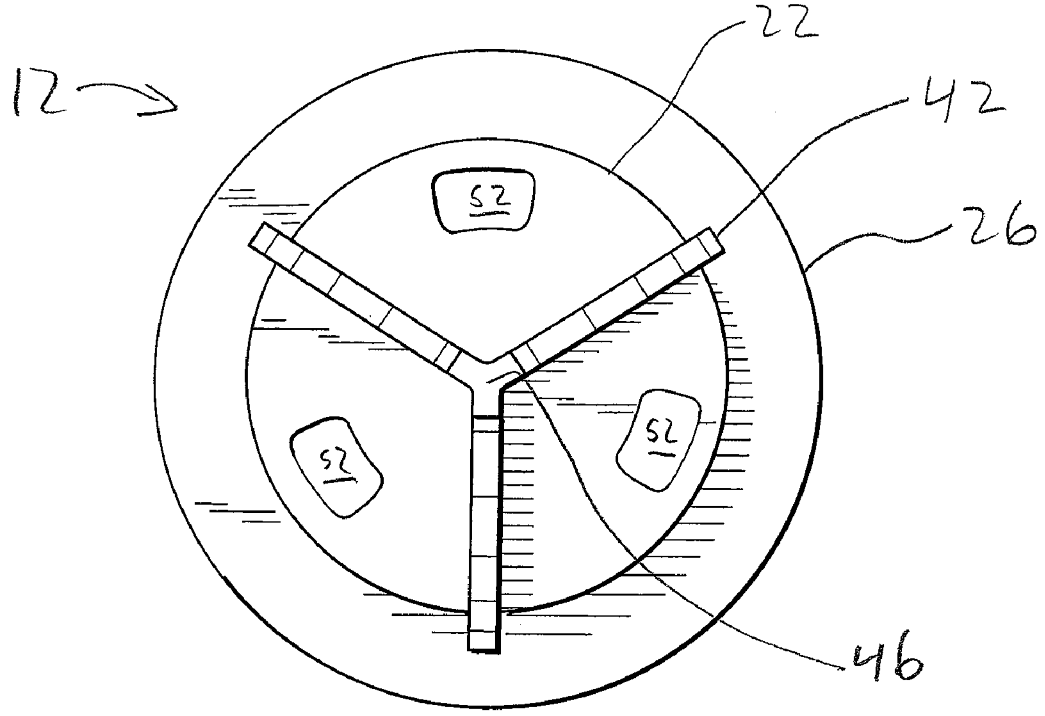
FIG. 5 is a bottom view of the base of FIG. 2.
Figure 6:
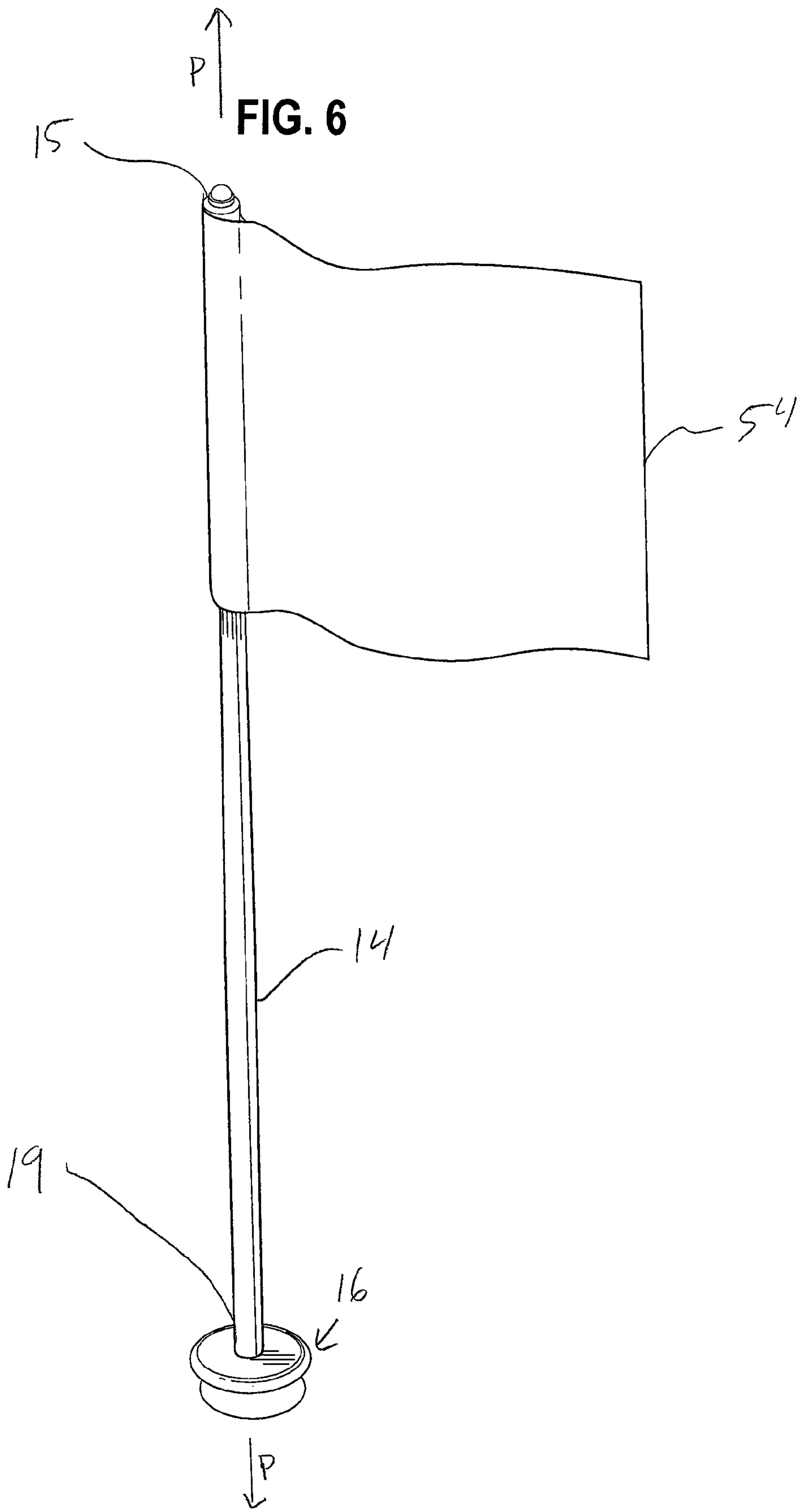
FIG. 6 is a perspective view of the flag pole of the assembly of FIG. 1.

The base upper mating portion 18 also preferably includes three openings 52. By one approach, the openings 52 are disposed relatively equally about the central axis B between the ribs 49 and axially aligned with the slots 47. By one approach, the openings 52 are generally through-holes that fluidly connect the exterior of the base 12 to the interior of the cavity 28 through the base mating portion 18, as shown in FIGS. 5 and 6. By one approach, the slots 47 and openings 52 also reduce the rigidity of the coupling member 48 so that the ribs 49 can resiliently flex more easily. In addition, the openings 52 may function as drainage holes to allow any water or other fluid that may accumulate within the channel 51, the pocket 29, and/or the cavity 28 to drain out of the upper mating portion 18.

With reference to FIGS. 1 and 6, the elongate post or pole 14 may be formed from a generally hard plastic material, wood, aluminum, or other suitable pole-type materials. The elongate post 14 includes a central axis P and preferably includes two opposite ends 15 and 19. A flag 54 or other marking object is preferably removably attached to one end 15 of the elongate post 14. The ferrule 16 is preferably fixedly secured to the opposite end 19 of the elongate post 14.

Figure 7:
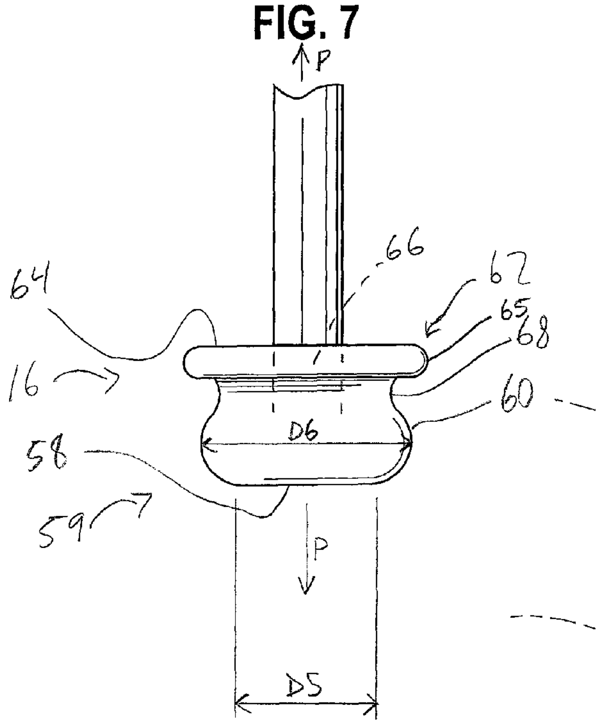
FIG. 7 is a side view showing a ferrule attached to the flag pole of FIG. 3.
Figure 8:
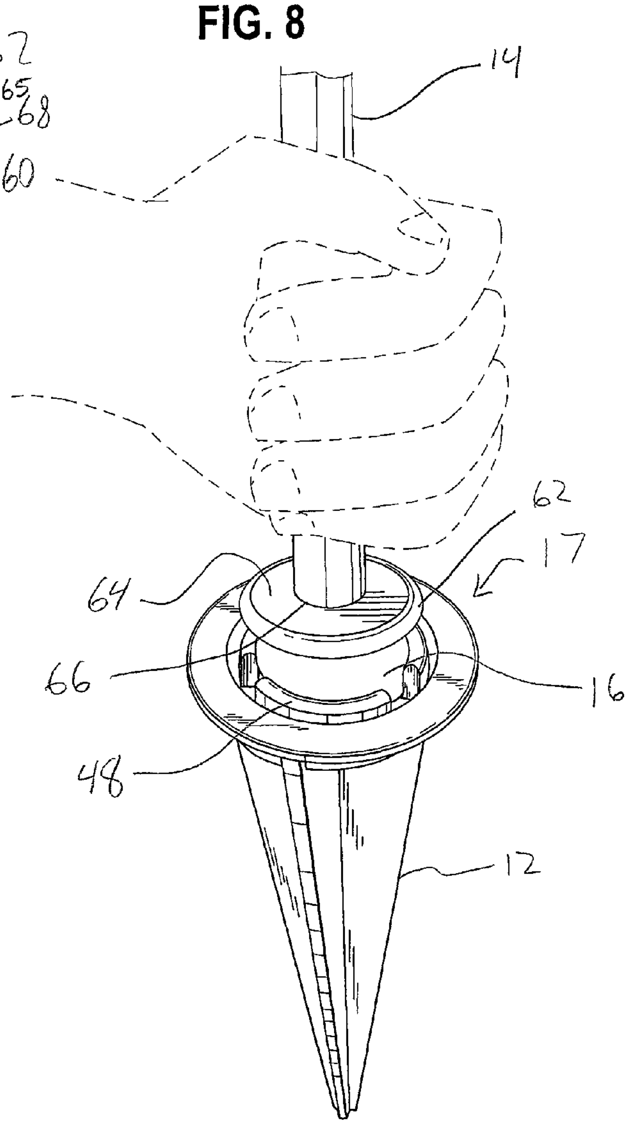
FIG. 8 is a partial perspective view of the base and flag pole of FIG. 1.

As shown in FIG. 7, the ferrule 16 may be made of a plastic material similar to the material used for the base 12. Alternatively, the ferrule 16 may be made from wood, ceramic, aluminum, or like materials. By one approach, the ferrule 16 includes a coupling portion 59, a lipped portion 62, and a central ferrule axis that extends along the post axis P. At a lower end of the coupling portion 59 and extending transverse to the central ferrule axis or post axis P is a ferrule or second mating surface 58. As discussed more below, the ferrule mating surface 58 is configured to mate or engage with the first or recessed surface 20 when the ferrule 16 is received in the base pocket 29 for orienting the base axis B and post axis P together so that the axes B and P are coaxial. The coupling portion 59 of the ferrule 16 also includes a curved outer surface 60 forming a sidewall thereof. The surface 60 has a curvature along the axis P so that at the intersection of the ferrule mating surface 58 and the outer surface 60, a diameter D5 is smaller than a diameter D6 at an intermediate point of the coupling portion 59 along post axis P, as shown on FIG. 7. At this intermediate point, the diameter of the coupling portion 59 is preferably the largest. The diameter thus increases from the ferrule mating surface 58 to the intermediate point. The outer surface 60 has a radius of curvature measured with respect to the post axis P, such that the outer surface 60 resembles a portion of a sphere where the outer surface 60 has a convex outer configuration.

As further discussed below, the curvature of the outer surface 60 of the ferrule coupling portion 59 is arranged and configured to cooperate with the coupling member 48 and the ribs 49 thereof to allow the ferrule 16 to be inserted in the pocket 29 with the post 14 oriented at an angle relative to the base axis B. In addition, the curvature of the outer surface 60 allows the ferrule 16 to be removed from the base pocket 29 with a force orthogonal to the axis B. At the same time, the insertion and removal of the ferrule 16 from the pocket 29 is preferably independent of a circumferential orientation of the ferrule about the axis B.

Figure 11:
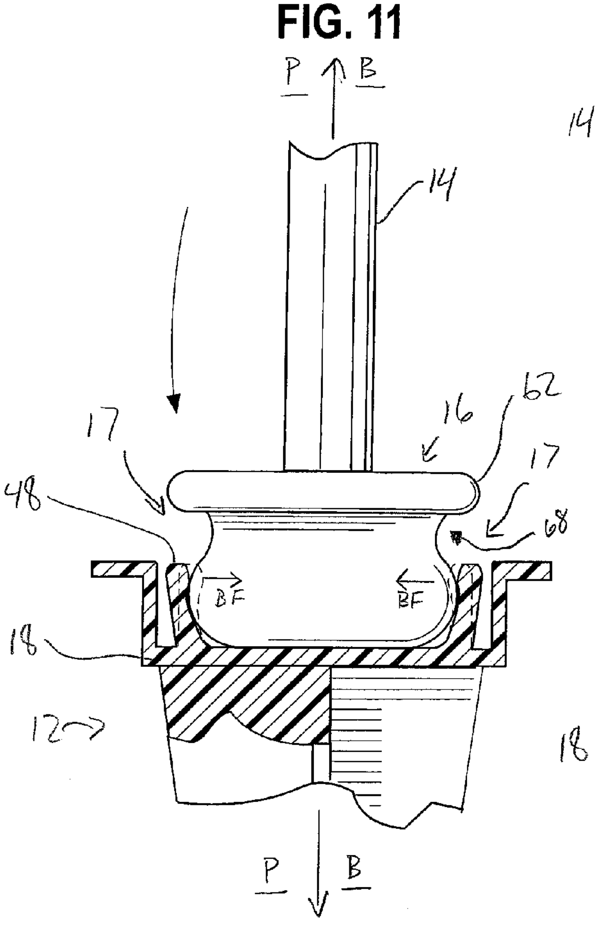
FIG. 11 is a side view showing the flag pole and base of FIG. 1 in an installed state.

At the end of the ferrule 16 opposite the ferrule mating surface 58 is the lipped portion 62. By one approach, the lipped portion 62 is integral with the other portions of the ferrule 16 and has a generally circular shape about the post axis P. The lipped portion 62 includes a lip surface 64 which is generally transverse to the post axis P and extends radially over the coupling portion 59. The lip surface 64 defines an extending lip 65 and an attachment recess 66 having a generally cylindrical shape. The diameter of the attachment recess 66 preferably corresponds to a diameter of the elongate post 14, such that the elongate post 14 can be inserted into the recess 66 to fixedly attach the ferrule 16 to the end of the elongate post 14. In one embodiment, the elongate post 14 is attached to the ferrule 16 such that it cannot easily be removed. However, the post 14 could also be attached in such a way that facilitates easy removal from the ferrule 16, such as through the use of a snap fit, threading, or other form of removable attachment. The convex curvature of the coupling portion 60 and the extending lip portion 65 of the lip portion 62 defines an annular depression 68 about the periphery of the ferrule 16. As best shown in FIG. 11, this depression 68 is disposed outside of the pocket 29 when the ferrule 16 is inserted into the base 12.

As shown in FIG. 11, the ferrule 16 and preferably the coupling portion 59 thereof is dimensioned such that it will correspond to the pocket 29 defined by the base 12. By one approach, the ferrule mating surface 58 has a diameter that is equal to or, more preferably, slightly smaller than a diameter of the coupling member 48 at the surface 21 between opposed ribs 49. By one approach, the convex outer surface 60 of the ferrule 16 generally corresponds to the concave internal surface 50 of the coupling member 48. The height of the ferrule 16, as measured along the post axis P, is greater than the height of the pocket 29 and the height of the coupling member 48. Thus, a portion of the ferrule 16, when inserted into the pocket 29 of the base 12, extends outside of the pocket 29. The lip portion 62 of the ferrule 16 is, therefore, also outside of the pocket 29.

As illustrated in FIGS. 9-12, coupling of the elongate post 14 to the base 12 is shown. More specifically, the end of the elongate post 14 having the ferrule 16 attached thereto is coupled to the base 12. The outer surface 60 of the ferrule 16, as described above, is curved having the generally convex shape to help facilitate coupling where the ferrule mating surface 58 is drawn toward the base recessed surface 20 to effect coupling.

The coupling members 48, as described above, have a generally arcuate shape along the base axis B so that the diameter D3 of the pocket 29 at the upper edge is preferably less than the maximum diameter D6 of the ferrule, which creates the coupling member opening 70 that is smaller than the generally spherical diameter of the ferrule 16. Thus, the ferrule 16 is restricted from being inserted into the base 12 at the coupling member 48 without resiliently flexing at least one of the ribs 49 away from the longitudinal base axis B.

Figure 10:
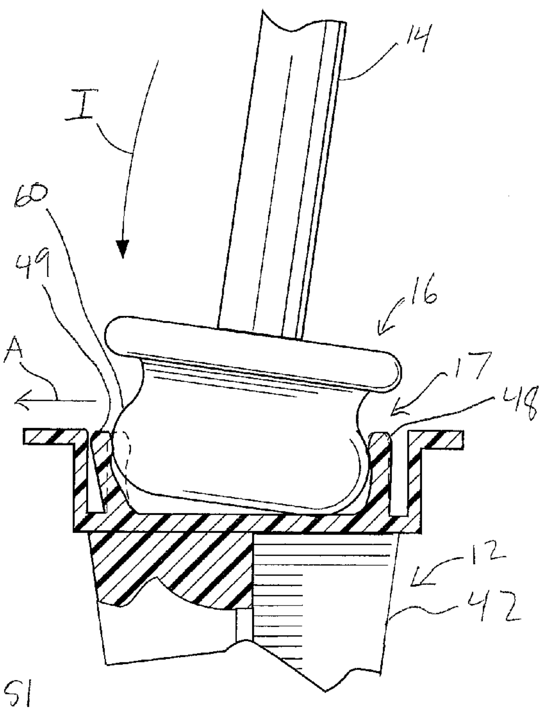
FIG. 10 is side view illustrating a subsequent step of the installation of FIG. 9.

As illustrated in FIG. 10, because the ferrule 16 has a diameter that is larger than the coupling member opening 70, at least one coupling member rib 49 tends to resiliently flex outward in a radial direction (arrow A) from its initial or unflexed position when the ferrule 16 is inserted in the pocket 29 toward the base recessed surface 20 (arrow I). While there are a plurality of ribs 49, it is possible for the ferrule 16 to be received in the pocket 29 when at least one rub 49 is resiliently displaced. However, multiple ribs 49 could flex outward to accommodate the insertion of the ferrule 16.

As shown in FIG. 10, the rib 49 is resiliently flexed by indication of the dashed lines. It will be appreciated that such level of flexing is only exemplary and may be more or less as needed for a particular application. For example, due to the resilient plastic material used in the base 12 and particularly the coupling member 48 and the relative difference between the maximum diameter of the ferrule 16 and the diameter of the coupling member opening 70, the coupling member 48 does not need to resiliently flex a large amount in order to allow the insertion of the ferrule 16 into the base pocket 29.

By one approach, the flexing may only be by a few millimeters. Further, because the coupling member 48 is formed from a resilient plastic material, there tends to be a biasing force (BF) applied by the coupling member 48 to hold the ferrule 16 in the pocket 29, as shown in FIG. 11. Preferably, the biasing force is in a radial direction transverse to the axis B and is applied opposite of the flexing of the ribs 49. This opposite biasing force retains the ferrule 16 in the base pocket 29 as illustrated in FIG. 11.

The amount of force needed to install the ferrule 16 in the base 12 can vary depending on the material used for the coupling member 48 and configurations of the rib 49 and slots 47 thereof. For example, the hardness, density, or other properties of the plastic can be varied if desired to allow for easier or harder insertion, depending on the needs of the end user. Harder plastics require more force to install. Additionally, the thickness and/or width of the coupling member ribs 49 or slots 47 can be altered to adjust the ease of installation. Thinner ribs 49 and/or larger slots 47 generally relate to less force to install the ferrule 16 as they will tend to resiliently flex easier. Additionally, the curvature of the ferrule 16 and coupling member 48 can also be altered to adjust the force to install the ferrule 16 in the base 12. When the curvature of the ferrule 16 or the ribs 49 is greater, insertion of the ferrule 16 in the pocket 29 requires the coupling member 48 to flex further, generally requiring more force. If the curvature is smaller, the coupling member 48 typically does not need to flex as much, requiring less force to install the ferrule 16.

Figure 12:
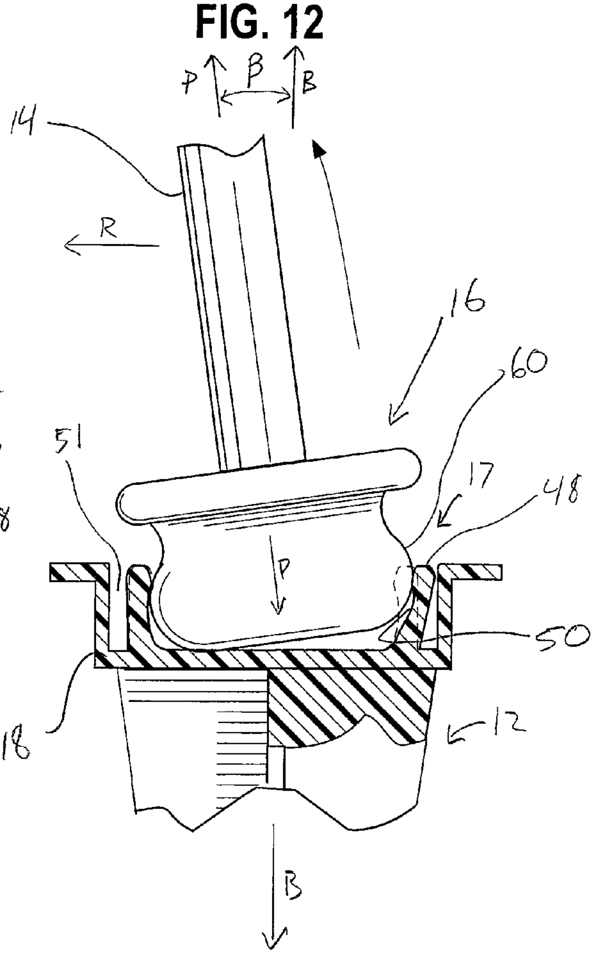
FIG. 12 is a side view showing a removal of the flag pole of FIG. 3 from the base of FIG. 2.

As shown in FIGS. 9, 10, and 12, the curvature of the ferrule 16 along the axis P allows the ferrule 16 to be inserted and removed from the base pocket 29 through a variety of angles and directions relative to the base axis B. For example, the post 14 and ferrule 16 can be inserted into the base pocket 29 when the post axis P is inclined at an angle α relative to the base axis B, as shown in FIG. 9. Once inserted, the resiliency of the material of the coupling member 48 snaps the ferrule 16 in place.

Once the ferrule 16 is received in the pocket 29, the ferrule mating surface 58 contacts or abuts the base recessed surface 20. Because the base recessed surface 20 is transverse to the longitudinal base axis B and the ferrule mating surface 58 is transverse to the post axis P of the ferrule 16 and post 14, the longitudinal base axis B and post axis P of the ferrule 16 are oriented substantially parallel and preferably relatively coaxial once installed, as shown in FIGS. 1 and 11. Thus, the engagement of the surfaces 20 and 58 tend to align the post axis P along the base axis B, which ensures correct alignment of the post 14 and base 12.

Once the ferrule 16 is inserted past the coupling member opening 70, the ferrule 16 is held in place tightly by the resiliency of the coupling member 48, as shown in FIG. 11, and the opposing biasing forces BF provided by the resiliency of the ribs 49 and preferably ribs 49 on opposite sides of the ferrule 16. This substantially secures the ferrule 16 to the base 12. The ferrule 16 generally requires no adjustment to lock the ferrule 16 (as in prior bayonet couplings) once coupled to the base 12 because of the generally spherical shape of the ferrule 16. However, in the event that the ferrule 16 needs to be rotated within the base 12, it is capable of movement by grabbing and rotating the lip portion 62 relative to the base 12 or by rotating the post 14. Even when rotated about the base axis B, the ferrule 16 stays secured to the base 12.

Referring now, to FIG. 12, in order to remove the elongate post 14 and ferrule 16 from the base 12, the user can push or apply a removal force R (arrow R in FIG. 12) to the elongate post 14 from the side to dislodge the ferrule 16 from the base 12. By one approach, this removal force R can be applied from substantially any direction, and preferably is generally transverse to the base axis B. This removal force R causes the ferrule 16 to overcome the holding forces BF of the coupling member 48 and pops the ferrule 16 out of the base 12 so that the post is removed from the base at some angle β relative to the base axis B, as shown in FIG. 12. Once the ferrule 16 is removed, the coupling member 48 returns to its initial or unflexed position and is capable of accommodating future installations of the ferrule 16 and elongate post 14. Such separation of the ferrule and base may leave the base 12 in place for future use and re-installation of the ferrule 16 and elongate post 14 at a later time. By removing the elongate post 14 and ferrule 16, but leaving the base 12 in place, users can quickly change from one type of elongate post 14 to another without having to replace or reinstall the base 12. Moreover, the post 14 can safely be knocked out of the base 12 upon contact by a person or object, such as a soccer ball, during a sporting event. If contacted by a person or object, the post 14 pops or snaps out of the base pocket 29 and safely falls to the ground. There is no build-up energy in a spring or other biasing member that causes the post 14 to snap back to its initial position as commonly found in the prior spring-based flag poles.

Another advantage of the assembly herein is the ability of the elongate post 14 to be installed or removed in any direction is illustrated in FIGS. 10 and 12 such as angles α and β for example. Such advantage results from the interface 17 between the ferrule 16 and the base 12 employing curved surfaces, and it avoids the shortcomings of the prior bayonet-type couplings. Installation from one direction is shown in FIG. 10, while removal in another direction is shown in FIG. 12. This feature ensures both easy installation and also easy removal either intentionally or in the event of unintentional contact.

The base 12, the ferrule 16, and the elongate post 14 can also be removed as a single unit by pulling straight up on the elongate post 14. This provides an easy method of removing the base 12 from the ground without the need to separately remove the base 12 out of the ground. Thus, when future use is unknown or not desired at the particular installation location, the base 12 and elongate post 14 can be quickly removed as one. If the base 12 and elongate post 14 are removed as a single assembly, the elongate post 14 can still be easily removed from the base 12 by grasping both the elongate post 14 and the base 12 and subsequently pushing or pulling the end of the elongate post 14 relative to the base axis B; or, put another way, by attempting to bend the assembly. This, like the method described above, causes the ferrule 16 to overcome the holding force BF of the coupling member 48 and pop out of the base 12. As described above, the base 12 and ferrule 16 are then capable of re-installation at a later time.

While the flag pole and base assembly has been described with respect to various examples and embodiments, those skilled in the art will appreciate that there are numerous variations, details, and permutations of the above described flag pole and base assembly that fall within the spirit and scope as set forth in the appended claims.

What is claimed is:

1. A flag pole and base assembly comprising:

a base for being secured to a surface, the base having a longitudinal base axis, a first mating surface extending transverse to the longitudinal base axis, and a wall extending upwardly along the longitudinal base axis from a perimeter of the first mating surface to an upper edge of the wall and defining a pocket therein;

an elongate post having a central post axis and opposite ends thereof;

a ferrule secured to one of the opposite ends of the elongate post and configured for being removably received in the base pocket, the ferrule including at least a coupling portion having a second mating surface extending transverse to the central post axis and a curved outer surface with a curvature along the central post axis such that a diameter of the coupling portion transverse to the central post axis at the second mating surface is less than a diameter intermediate the coupling portion;

a coupling interface between the ferrule and the base configured to position the central post axis along the longitudinal base axis when the ferrule is received in the base pocket as the second mating surface of the coupling portion engages the first mating surface of the base;

the curvature of the outer surface of the ferrule coupling portion along the central post axis and the upper edge of the base wall are configured for allowing the ferrule to be inserted in the base pocket with the elongate post oriented at an inclined angle relative to the base longitudinal axis and for allowing the ferrule to be removed from the base pocket with a force orthogonal to the longitudinal base axis with both the insertion and the removal configurations independent of a circumferential orientation of the ferrule about the longitudinal base axis;

wherein the base pocket wall is annular and at least partially surrounds the base longitudinal axis; and wherein the annular wall includes separate segments spaced circumferentially about the longitudinal base axis at the perimeter of the first mating surface.

2. The flag pole and base assembly of claim 1, wherein the wall of the base pocket has a curved inner surface along the longitudinal base axis such that a diameter of the pocket transverse to the longitudinal base axis at the upper edge thereof is less than a diameter of the base pocket intermediate the upper edge and the first mating surface.

3. The flag pole and base assembly of claim 2, wherein the curvature of the curved outer surface of the ferrule generally conforms to a curvature of the curved inner surface of the base pocket wall.

4. The flag pole and base assembly of claim 1, wherein the upper edge of the base wall defines an annular opening to the pocket so that the ferrule can be inserted and removed from the pocket independent of the circumferential orientation of the ferrule about the longitudinal base axis.

5. The flag pole and base assembly of claim 1, wherein the wall is formed from a resilient material such that the upper edge thereof is free to flex transverse to the longitudinal base axis upon the coupling of the ferrule being inserted into and removed from the pocket.

6. The flag pole and base assembly of claim 1, wherein the base includes a depending spike so that the base can be inserted into the ground.

7. The flag pole and base assembly of claim 1, wherein the other end of the elongate post includes a flag.

8. The flag pole and base assembly of claim 1, wherein the base further includes drainage holes adjacent the wall arranged and configured to permit fluids to drain out of the pocket.

9. A removable in-ground flag pole assembly comprising:

a pole with a first longitudinal axis and having opposite ends with a flag on one of the opposite ends;

a ferrule attached to the other of the opposite ends, the ferrule defining a flat mating surface extending transverse to the first longitudinal axis at an end thereof and an annular sidewall portion having a convex outer surface extending along the first longitudinal axis;

a mounting base with a second longitudinal axis and configured for being mounted to a surface, the mounting base having an annular rim defining an opening to a pocket configured to removably receive the ferrule, the pocket having a concave inner surface along the second longitudinal axis and a flat mating surface transverse to the second longitudinal axis;

a ball and socket coupling joint defined by the convex outer surface of the ferrule and the concave inner surface of the pocket when the ferrule is received in the pocket, the ball and socket coupling joint configured to allow the pole to be inserted in the pocket oriented at an angle relative to the second longitudinal axis so that an engagement of the flat mating surfaces transverse to the first and second longitudinal axes orients the first longitudinal axis along the second longitudinal axis;

wherein the concave inner surface of the base pocket defines a sidewall thereof that is spaced inwardly from a main body portion of the mounting base so that an upper edge of the sidewall is configured to adjust radially outward when the ferrule is inserted into and removed from the pocket; and wherein the sidewall includes separate wall segments spaced circumferentially about the longitudinal base axis at a perimeter of the first mating surface with an axial slot between adjacent wall segments.

10. The removable in-ground flag pole assembly of claim 9, wherein the annular rim of the mounting base forms an overhang extending over the flat mating surface of the pocket such that a received ferrule is secured to the mounting base by the annular rim and can be rotated about the second longitudinal axis of the mounting base without being released from the pocket.

11. The removable in-ground flag pole assembly of claim 9, wherein the convex outer surface of the ferrule has a curvature thereof generally conforming to the concave curvature of the inner surface of the pocket.

12. The removable in-ground flag pole assembly of claim 9, wherein the separate wall segments are formed from a resilient material such that an upper edge thereof at the annular rim is free to flex transverse to the second longitudinal axis upon the ferrule being inserted into and removed from the pocket.

13. A removable in-ground flag pole assembly comprising:

a pole with a first longitudinal axis and having opposite ends with a flag on one of the opposite ends;

a ferrule attached to the other of the opposite ends, the ferrule defining a flat mating surface extending transverse to the first longitudinal axis at an end thereof and an annular sidewall portion having a convex outer surface extending along the first longitudinal axis;

a mounting base with a second longitudinal axis and configured for being mounted to a surface, the mounting base having an annular rim defining an opening to a pocket configured to removably receive the ferrule, the pocket having a concave inner surface along the second longitudinal axis and a flat mating surface transverse to the second longitudinal axis;

a ball and socket coupling joint defined by the convex outer surface of the ferrule and the concave inner surface of the pocket when the ferrule is received in the pocket, the ball and socket coupling joint configured to allow the pole to be inserted in the pocket oriented at an angle relative to the second longitudinal axis;

wherein the concave inner surface of the base pocket defines a sidewall thereof and includes separate wall segments spaced circumferentially about the longitudinal base axis at a perimeter of the first mating surface with an axial slot between adjacent wall segments;

wherein the separate wall segments are formed from a resilient material such that an upper edge thereof at the annular rim is free to flex transverse to the second longitudinal axis upon the ferrule being inserted into and removed from the pocket; and wherein the separate wall segments are spaced radially inwardly from a main body portion of the mounting base forming an annular channel therebetween, the annular channel providing a space for the upper edge of the separate wall segments to flex into when the ferrule is inserted into and removed from the pocket.

14. The removable in-ground flag pole assembly of claim 9, wherein the mounting base includes a depending spike so that the mounting base can be inserted into the ground.

15. The removable in-ground flag pole assembly of claim 9, wherein the mounting base further includes drainage holes adjacent the convex inner surface arranged and configured to permit fluids to drain out of the recessed pocket.

* * * * *

UNITED STATES PATENT AND TRADEMARK OFFICE

CERTIFICATE OF CORRECTION

PATENT NO. : 8,177,185 B2
APPLICATION NO. : 12/699148
DATED : May 15, 2012
INVENTOR(S) : Jack C. Priegel It is certified that error appears in the above-identified patent and that said Letters Patent is hereby corrected as shown below:

IN THE CLAIMS:

Column 9, line 15, in claim 1, after "base" insert --so that the engagement of the transverse mating surfaces orients the central post axis along the longitudinal base axis--

Signed and Sealed this
Twenty-fifth Day of September, 2012

David J. Kappos

David J. Kappos
*Director of the United States Patent and Trademark Office*